United States Patent [19]
Campbell

[11] 3,976,867
[45] Aug. 24, 1976

[54] CALCULATOR TIMER WITH SIMPLE BASE-6 CORRECTION

[75] Inventor: Alleyne Resue Campbell, Willingboro, N.J.

[73] Assignee: RCA Corporation, New York, N.Y.

[22] Filed: Dec. 10, 1975

[21] Appl. No.: 639,404

[52] U.S. Cl. ............................... 235/169; 58/23 R; 58/24 A; 235/92 T
[51] Int. Cl.[2] ........................ G06F 7/50; G04F 5/00
[58] Field of Search ................. 235/169, 170, 92 T, 235/92 TF, 155; 58/23 R, 23 AC, 24 R, 24 A, 33, 39.5

[56] References Cited
UNITED STATES PATENTS

| | | |
|---|---|---|
| 3,806,719 | 4/1974 | Yamamura et al. ................ 235/170 |
| 3,809,872 | 5/1974 | Yamamura et al. ................ 235/170 |
| 3,876,867 | 4/1975 | Schull et al. ...................... 235/92 T |
| 3,889,459 | 6/1975 | Lu .................................... 58/23 AC |
| 3,922,531 | 11/1975 | Willmann et al. ................. 235/92 T |

*Primary Examiner*—Jerry Smith
*Attorney, Agent, or Firm*—Carl M. Wright; Edward J. Norton

[57] ABSTRACT

Timer circuit using commercially available fourfunction calculator circuit uses a fast clock to count values from 60 to 100. This transforms the tens of seconds digit to base six.

1 Claim, 1 Drawing Figure

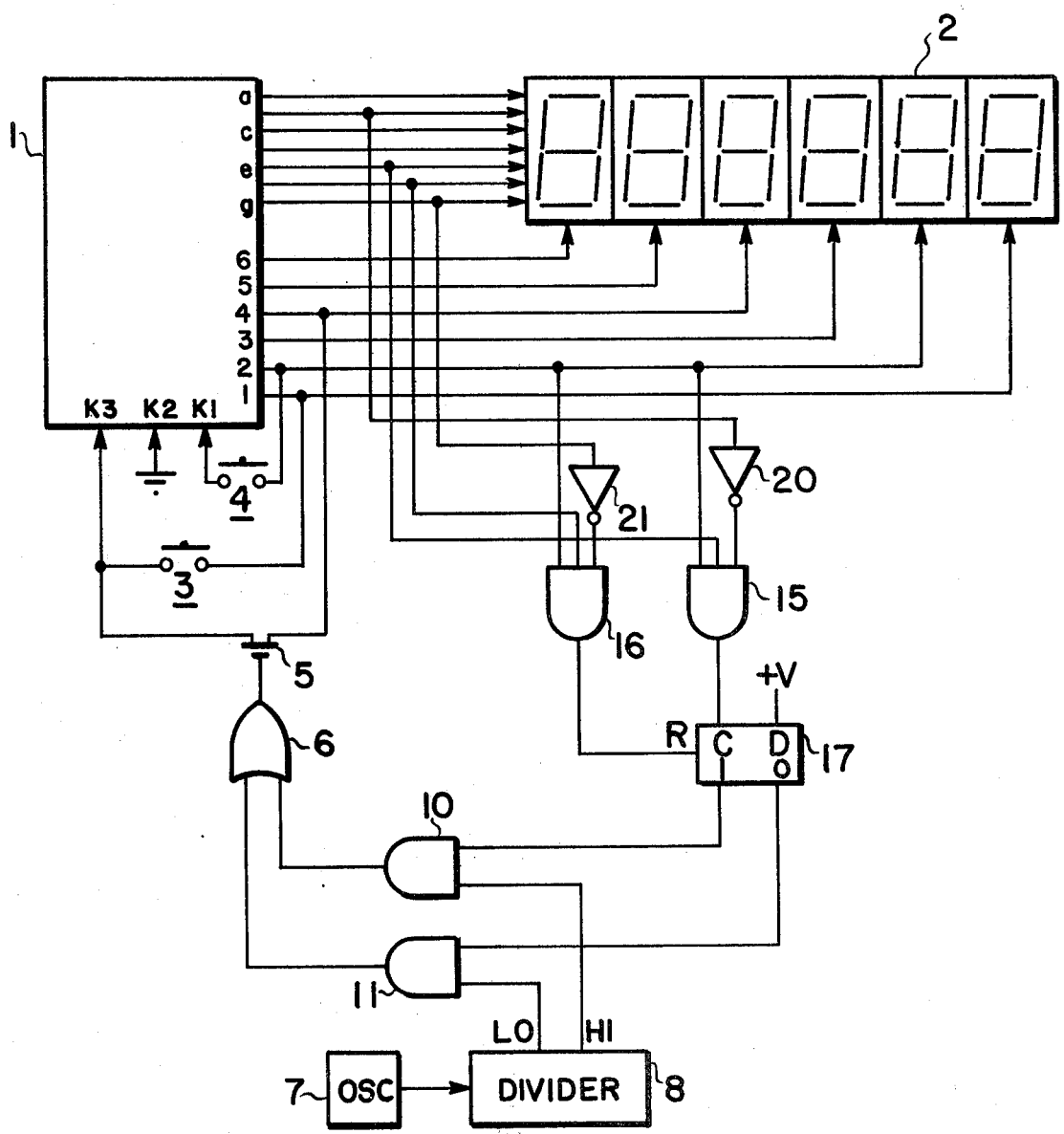

CALCULATOR TIMER WITH SIMPLE BASE-6 CORRECTION

BACKGROUND OF THE INVENTION

Commercially available, low cost calculator integrated circuits provide economical and reliable devices for making counters and timers. Because of their large numbers, four-function calculator circuits and associated displays can be obtained for much less cost than individual counter circuits and display devices.

Calculator circuits having an autosumming feature are the simplest to use in a counter circuit. The autosumming feature permits a number to be entered via the keyboard switches and each subsequent operation of the add (plus) key then causes the entered number to be added to the accumulated result which is continuously displayed. An example of a low cost, four-function calculator having the autosumming feature is type MM5736 (National Semiconductor Corp.).

If used as a counter, a keyboard is not required. Only three switches for clearing (resetting), start, and count are needed. In addition to the calculator circuit and switches, a display circuit is required. A type NSA1166 (National Semiconductor Corp.) is a commercially available unit suitable for use with the MM5736. Because the power output from the calculator chip is usually limited, a digit driver is used to provide the power needed to drive the display. For the devices already identified, a type DM75492 (National Semiconductor Corp.) is suitable. The connections required between the specific devices are shown in application notes. See also, for example, *Electronic Design* 26, Dec. 20, 1974, pp. 90–95, and *Popular Electronics*, Vol. 8, No. 5, Nov., 1975, pp. 88, 90–91.

The count switch can be replaced by an oscillator-driven switch. If the oscillator has a frequency of one second, the resulting circuit is a timer displaying accumulated seconds. A problem with a seconds counter is that users are accustomed to hours, minutes, and seconds notation. The calculator, on the other, uses only decimal numbers. When circuitry is added to convert the decimal output values to hours, minutes, and seconds notation, the result is a complex and expensive system that outweighs the economies originally achieved by using low cost, commercially available calculator devices.

The invention described herein is a circuit for converting a calculator timer to a minutes and seconds display using low cost, commercially available devices in an economical configuration whose cost magnitude is of the same order as the simple calculator timer circuit.

SUMMARY OF THE INVENTION

According to the invention, a timer using a calculator circuit senses the tens of seconds digit of the accumulated time result signals. When a value of sit is recognized, a fast clock operates the timer until a value of zero is detected in the tens of seconds digit.

BRIEF DESCRIPTION OF THE DRAWING

The sole FIGURE is a logic diagram illustrating a preferred embodiment of the invention.

DETAILED DESCRIPTION OF THE INVENTION

In the FIGURE, a calculator 1 is coupled to a display unit 2. The calculator 1 can be, for purposes of illustration, a type MM5736 earlier described, which produces output signals for a display of six digits. The display 2 comprises six seven-segment character positions. The digits are multiplexed by the calculator 1 using six digit output lines. Typically, the segment signals a-g from the calculator are produced for digit one followed by a strobe or enabling output signal for digit one. At the completion of the digit one strobe, the segments output signals for the second digit are produced and are subsequently strobed by a digit two signal, and so on. In practical applications, the a-g segment output lines from the calculator 1 are coupled to the display 2 through current-limiting, isolation resistors and the digit drive lines one through six are coupled through a driver as previously described.

The digit lines are also used to access the keyboard switches for gating data into the calculator 1. During keyboard access, the digit lines are primed in sequence and the keys, coupled to the various digit lines, are also coupled to the one of three input terminals identified as K1, K2 and K3. The following table (Table I) shows the typical key connections for the above-identified calculator chip.

TABLE I

| DIGIT LINE | DATA INPUT K1 | DATA INPUT K2 | DATA INPUT K3 |
|---|---|---|---|
| 1 | 0 | NC | CLR |
| 2 | 1 | 6 | NC |
| 3 | 2 | 7 | — |
| 4 | 3 | 8 | + |
| 5 | 4 | 9 | × |
| 6 | 5 | NC | ÷ |

As shown in the table, pressing the plus key, for example, couples the digit line four and the data input terminal K3.

This causes the calculator circuits to add a value previously entered to the value being displayed. Therefore, by activating the plug key once per seconds after a value of one has been entered causes the calculator to increment the display value by every second. Entry of the data is usually preceded by manually activating a clear switch 3 which couples the digit line one and the data input terminal K3. This resets the circuits in the calculator to an initial state. Manually activating a start switch 4 couples the digit line two and the K1 input terminal which, as seen from the data input table, enters the value of one into the calculator.

Another switch, shown as a field effect transistor 5, couples the digit line four and the data input terminal K3, i.e., acts as a plus switch, so that each time the switch 5 is automatically activated in a manner to be described, the previously entered value of one is added to the displayed value.

An oscillator 7 drives a frequency divider 8 which produces two output frequencies. The low frequency, in this illustration, is one cycle per second. The high frequency is approximately 64 cycles per second. The oscillator, in the example, can have a frequency of 16.384 KHz. The frequency divider 8 can be an appropriate count down counter, e.g., a CD4020 (RCA Corporation) taking the low frequency output signal from the fourteenth stage (Q14, pin 3) and the high frequency output signal from the eighth stage (Q8, pin 13). The low and high frequency output signals are coupled, respectively, each to an input terminal of one of two AND gates 10 and 11. The output signals from the AND gates 10 and 11 are coupled as input signals to an OR gate 6 which operates the switch 5. When gate 11 is primed, therefore, the switch 5 is activated at intervals of one second. When the AND gate 10 is primed, the switch 5 is activated 64 times per second. The high frequency, 64 cycles per second, is limited by the de-bounce circuits used in the calculator chip. The de-bounce circuits are delays at the switch inputs to permit the switch closure noise to subside before gating the data into the calculator.

When the second digit of the display, which corresponds to the tens of seconds digit, is a six, the AND gate 11 is disabled and the AND gate 10 is enabled so that the counter counts at the high frequency, 64 Hz. The display is incremented at this faster rate until a zero is detected as the second digit. When a zero is detected, the AND gate 10 is disabled and the AND gate 11 is enabled to continue the count at 1 Hz. The result is that, when the count representing seconds of time reaches a value of 60, the display is counted up to a hundred in five-eighths of a second which causes a carry to the digits representing minutes units and displays zeroes for the seconds count.

The six is detected by an AND gate 15, the output signal from which clocks a D-type flip-flop 17 to the set state so that the one (set) output signal is high and the zero (reset) output signal is low. A value of zero in the second digit is detected by an AND gate 16 which resets the flip-flop 17 so that the zero output is high and the one output is low. The one output signal activates the AND gate 10 and the zero output signal from the flip-flop 17 activates the AND gate 11. Thus, when the flip-flop 17 is set, the counter is clocked at the high frequency and when reset, is clocked at the low frequency. The values of six and zero are detected from the segment output signals at the time that the second digit is strobed. The following data display table (Table II) showing the segment displayed for each number illustrates the manner in which the numbers zero and six are identified from the segment output lines from the calculator 1.

TABLE II

| DISPLAY DIGIT | DATA DISPLAY (1 = lighted; o = dark) SEGMENT | | | | | | |
|---|---|---|---|---|---|---|---|
| | a | b | c | d | e | f | g |
| 0 | 1 | 1 | 1 | 1 | 1 | 1 | 0 |
| 1 | 0 | 1 | 1 | 0 | 0 | 0 | 0 |
| 2 | 1 | 1 | 0 | 1 | 1 | 0 | 1 |
| 3 | 1 | 1 | 1 | 1 | 0 | 0 | 1 |
| 4 | 0 | 1 | 1 | 0 | 0 | 1 | 1 |
| 5 | 1 | 0 | 1 | 1 | 0 | 1 | 1 |
| 6 | 0 | 0 | 1 | 1 | 1 | 1 | 1 |
| 7 | 1 | 1 | 1 | 0 | 0 | 0 | 0 |
| 8 | 1 | 1 | 1 | 1 | 1 | 1 | 1 |
| 9 | 1 | 1 | 1 | 0 | 0 | 1 | 1 |

The segments of each digit are identified clockwise starting with the top bar as *a* and ending with the center crossbar as *g*. The digit six is distinguished from the other digits by the fact that the *b* segment is dark when the *e* segment is lighted or that the *b* segment is dark when the *a* segment is dark. In the embodiment, the first criteria is used which reduces the number of inverters required. The output signal for the segment *b* is coupled to an inverter 20, the output of which is coupled to the AND gate 15. Another input signal to the AND gate 15 is the segment *e* output signal from the calculator 1. The third input signal to the AND gate 15 is the second digit drive line. Thus, when the second digit is a six, the AND gate 15 will be activated and clock the flip-flop 17 to the set state.

The zero digit is distinguished from the others by the fact that it is the only digit having a dark *g* segment when the *f* segment is lighted. Therefore, the AND gate 16 is activated by the signal from the *f* segment output terminal and the inverted signal, via an inverter 21, from the segment *g* output terminal at the time the second digit is displayed. When a zero is detected by the AND gate 16, the flip-flop 17 is reset.

Other features which might be added include a set signal from the clear switch 3 to the flip-flop 17. The flip-flop 17 itself can be an RS-type flip-flop, which can be implemented by crosscoupled gates. The switch 5 can be a transistor coupled with the correct polarity for passing current or a relay, such as a reed type.

It has been shown how a base-6 correction can be made for a calculator timer by running up the count at as fast a rate as possible to skip over the undesired decimal counts.

Various modifications to the systems and circuits described and illustrated to explain the concepts and modes of practicing the invention might be made by those of ordinary skill in the art within the principles or scope of the invention as expressed in the appended claims.

What is claimed is:

1. In a timing system comprising a calculator circuit means having an accumulated results output digit means with at least a tens of seconds digit means, display means responsive to the accumulated result output digit means for providing an indication of accumulated results, timer clock means for producing periodically spaced pulses having a period equal to a desired timing period, switching means responsive to clock means for incrementing the accumulated result, the improvement comprising:
    fast clock means for producing pulses at a substantially greater rate than said timer clock means;
    first recognition means responsive to said accumulated results output means for producing an output signal when said tens of seconds digit means has a value of six;
    second recognition means responsive to said accumulated results output means for producing an output signal when said tens of seconds digit means has a value of zero; and
    clock selection means responsive to the output signal from said first recognition means for coupling said fast clock means to said switching means and to the output signal from said second recognition means for coupling said timer clock means to said switching means.

* * * * *